United States Patent Office 2,773,490
Patented Dec. 11, 1956

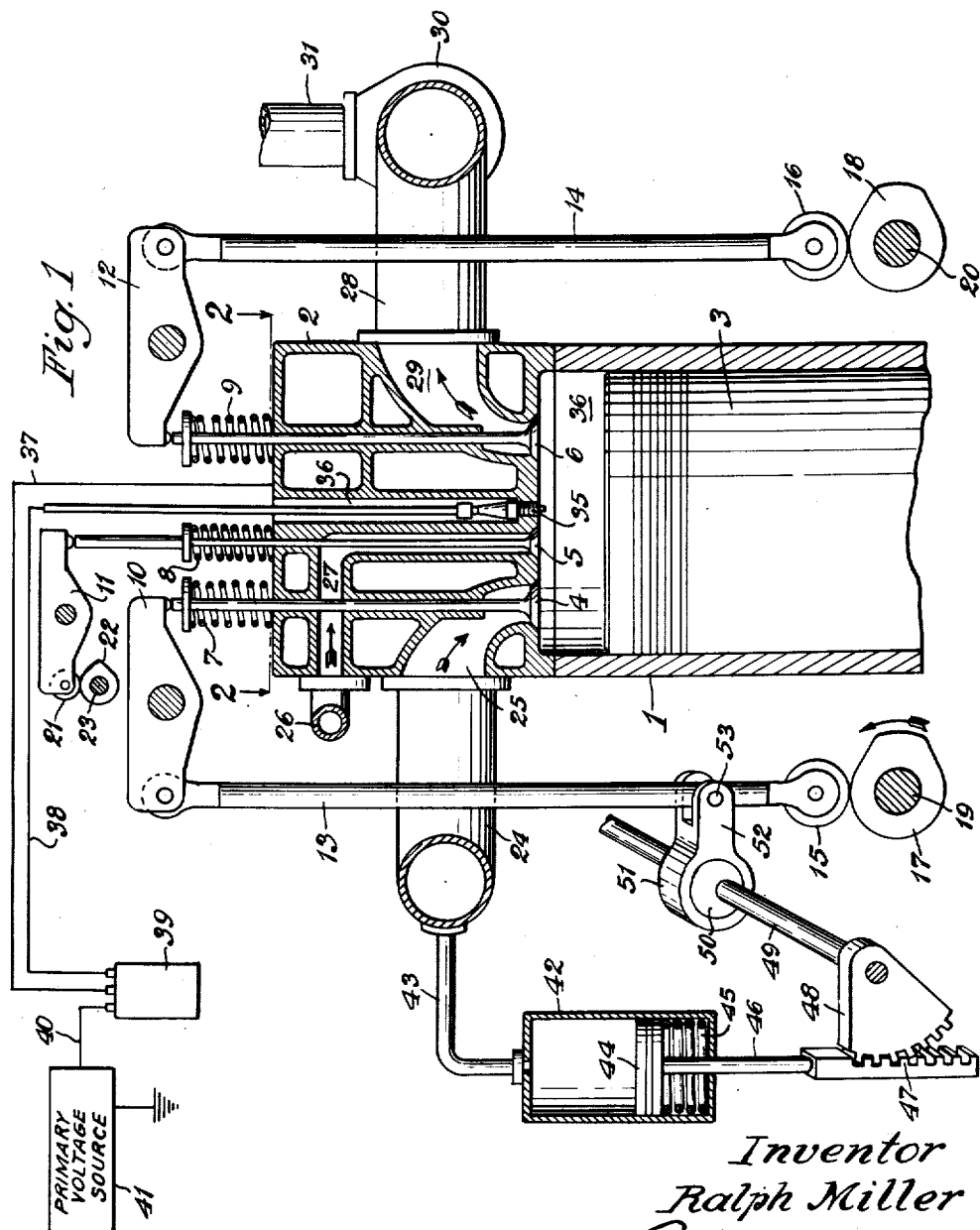

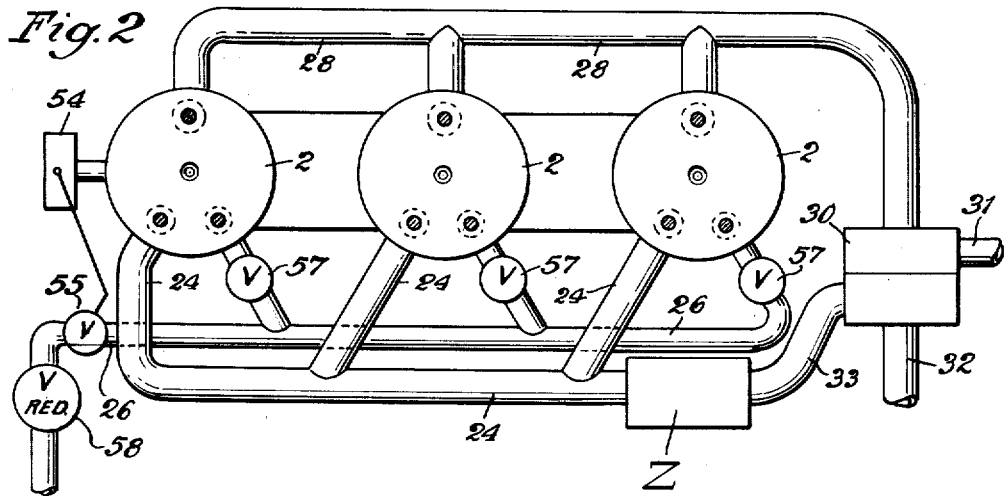
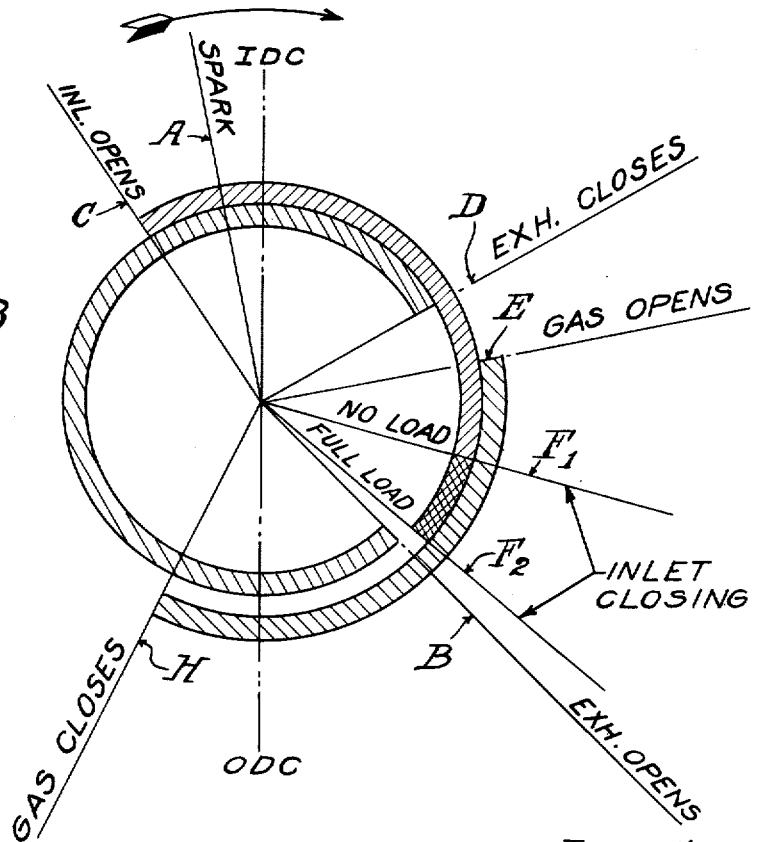

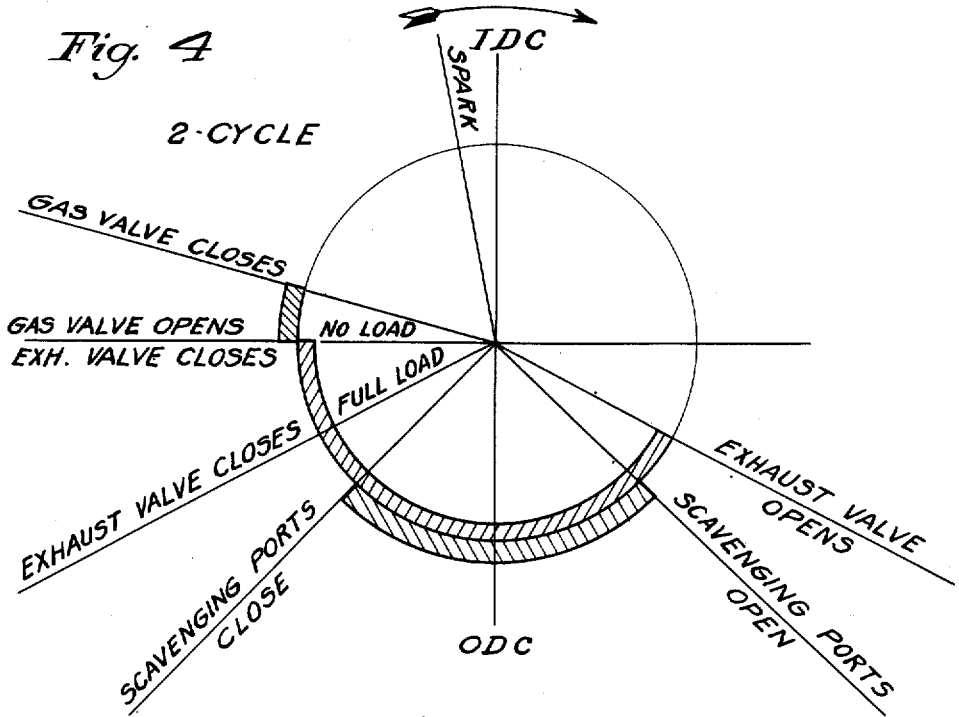
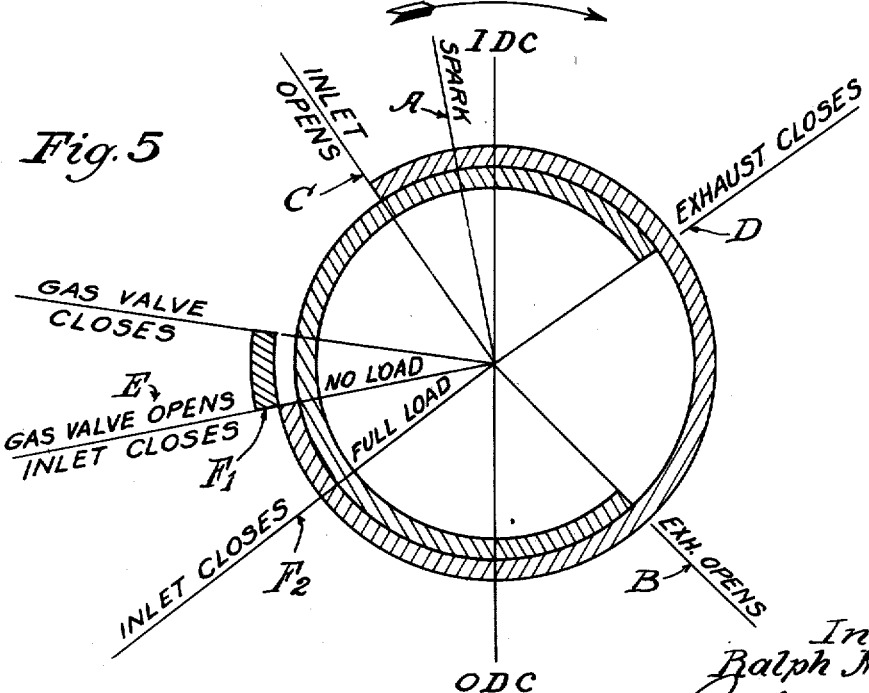

2,773,490

HIGH EXPANSION, SPARK IGNITED, GAS BURNING, INTERNAL COMBUSTION ENGINES

Ralph Miller, Milwaukee, Wis.

Application September 23, 1952, Serial No. 311,032

10 Claims. (Cl. 123—75)

My invention relates to improvements in high expansion spark ignited internal combustion engines of the type wherein a combustible mixture enters or is formed in the cylinder before ignition takes place.

My invention is applicable to gas engines burning a fuel which is in gaseous condition at ordinary atmospheric temperature and pressure. Such gases as natural gas, water gas, propane, methane and the like are types of gaseous fuel to which my engine is well adapted, and the appended claims should be so interpreted.

My invention is also applicable to those engines wherein liquid or non-gaseous fuel is atomized or distributed mixed with air in the cylinder to form an explosive mixture. Thus an engine embodying my invention may be one wherein the gaseous state has been reached in the cylinder by the injection of fuel in a liquid state or wherein the fuel may be admitted to the cylinder in a gaseous or atomized state. In any event, I direct my invention to a situation where in contrast with diesel operation fuel is mixed in combustible proportions with the air in the cylinder and the combustible or explosive mixture is established in the cylinder before rather than as ignition takes place. It is well known that high compression gas burning engines, wherein the compression pressure is in the order of the compression pressures used in diesel or self-ignition type engines, have for satisfactory operation, required something more than the compression pressure or temperature to ignite the charge. It has been proposed to inject a small amount of pilot fuel oil of the type which will ignite satisfactorily under diesel engine compression pressures and temperatures to start the burning in the cylinder. It has also been proposed to use an electric spark plug to ignite the charge, the point being that in every case, smooth, accurate ignition and combustion of a gaseous fuel without such additional ignition means has not proven satisfactory. In order to get satisfactory operation of such an engine burning gas, or a gas-like or atomized fuel, it was necessary to use a relatively lean mixture and when electric ignition was used, it was necessary to use unusually high voltages because the great amount of excess air increased the density of the compressed mixture charge in which the electric spark had to be discharged.

I have found that when conditions in the engine are properly controlled, rich mixtures of gaseous fuel in the order of from one part gas to ten parts of air up to one part of gas to twelve parts of air or in the order of zero to 40% excess air may be satisfactorily ignited with a spark at ordinary voltages, say from fifteen to twenty thousand volts.

I have found that exremely lean mixtures are necessary to prevent pre-ignition when the mixture is compressed to a high temperature. Thus the compression temperature resulting from a compression ratio of twelve to one, when starting with a manifold temperature of about 100 degrees F. and cylinder heating of 30 degrees F., will be 1130 degrees F. and will cause pre-ignition of the charge unless a great amount of excess air is used in the mixture.

On the other hand a compression ratio of six to one, with compression of the mixture starting at a temperature of 100 degrees F. plus 30 degrees cylinder heating, will result in a mixture temperature at the end of the compression stroke of 740 degrees F. and this engine can be operated with chemically correct gas-air mixture or small amount of excess air without pre-ignition. However, because the expansion ratio is also six to one, the thermal efficiency is much lower than in the above engine where the expansion ratio is twelve to one. These efficiencies, when corrected for the loss due to lean mixture in the latter, will result in fuel consumptions in the order of 6500 B. t. u. per B. H. P. per hour with the twelve to one ratio and 8300 B. t. u. per B. H. P. per hour with six to one compression ratio In my invention, I have a method of reducing the temperature of the compressed mixture by means other than reducing the cylinder compression ratio or by reducing the charge temperature in the manifold, as will hereinafter be described.

Thus I can operate my engine with chemically correct gas-air mixture as in the low compression engine but with the high thermal efficiency of the high expansion ratio engine and with the further improved efficiency resulting from low excess air. As a further advantage, my engine carries a greater load or mean effective pressure because the chemically correct or low excess air mixture has a greater B. t. u. content than the lean mixture.

Thus my engine can operate very well with gasoline injection, also with diesel fuel, such as was used in the Hesselman engine where the diesel fuel was injected in the middle of the compression stroke, atomized, mixed with the air to form an explosive mixture, then ignited with a spark.

My invention is illustrated more or less diagrammatically in the accompanying drawings, wherein—

Figure 1 is a vertical view partly a perspective of the valve-actuating mechanism and partly in section through the engine cylinder and cylinder head;

Figure 2 is a horizontal section along the line 2—2 of Figure 1 with several parts omitted;

Figure 3 is a crankshaft valve timing diagram illustrating an application of my system to a four-cycle engine in which the inlet valve closes before the end of the suction stroke;

Figure 4 is a similar crankshaft valve timing diagram illustrating an application of my system to a four-cycle engine in which part of the charge is rejected;

Figure 5 is a similar crankshaft valve timing diagram illustrating an application of my system to a two-cycle engine.

Like parts are indicated by like characters throughout the specification and drawings.

1 is the engine cylinder having a cylinder head 2, a piston 3, an air inlet valve 4, a gas inlet valve 5, and an exhaust valve 6. Each of the three valves is mounted for reciprocation in the cylinder head, being seated in the usual manner by the springs 7, 8 and 9. Where liquid fuel is used, an injection nozzle is substituted for the gas inlet valve 5.

The valves 4, 5 and 6 are actuated respectively by rocker arms 10, 11, 12, the rocker arms 10, 12 are actuated by push rods 13, 14 which terminate in cam rollers 15 and 16, engaging respectively the air inlet cam 17, on the air inlet cam shaft 19 and the exhaust cam 18 on the exhaust cam shaft 20. The rocker arm 11 is actuated by a cam roller 21 engaging the gas inlet cam 22 on the gas inlet cam shaft 23. The cam shafts 19, 20 and 23 are driven by the engine crankshaft in the usual manner, or all cams may be on a common shaft.

The shafts are shown as separate, for clarity in illustration. The further details being conventional are not illustrated.

24 is the air inlet manifold communicating with the air inlet passage 25 in the cylinder head, the passage terminating in the air inlet port controlled by the air inlet valve 4. An intercooler is diagrammatically indicated at Z in Figure 2. 26 is the gas inlet manifold communicating with a gas inlet passage 27 terminating in a gas inlet port controlled by the gas inlet valve 5. 28 is an exhaust manifold communicating with an exhaust passage 29, terminating in an exhaust port controlled by the exhaust valve 6. The gas may be a gaseous material which remains in gaseous state at atmospheric temperature and pressure or thereabout or it may be a mixture of air and atomized or mechanically vaporized fuel. In which case, if desired, both gas and air might enter through the passage 25. Also the same effect might perhaps be obtained by injecting liquid fuel separately into the chamber with the air, the liquid fuel being injected and there vaporized to form a gaseous mixture.

The exhaust manifold 28 may discharge into a turbo blower 30, the exhaust gas passing thence to atmosphere through the discharge pipe 31. Air enters the turbo blower through an inlet 32 and is supplied under pressure through a duct 33 to the inlet manifold 24.

Though my invention may be applied to naturally aspirated engines, I shall now describe its application to a supercharged engine.

35 is a spark plug in the clearance space 36 within the cylinder. Ignition wires 37, 38 lead from the spark plug 35 to an ignition transformer 39, the ignition transformer being energized by current through wire 40 from a primary voltage source 41. The means for timing the spark are conventional and the relationship between them and the engine crankshaft is therefore not illustrated in detail. Suffice it to say that the ignition transformer supplies voltage to the spark plug at a suitable voltage or voltage range.

The timing of the exhaust valve and the gas inlet valve is built into the engine and fixed by engine design and construction in the usual manner. The time of closing of the air inlet valve is adjusted in response to variation in engine load in the following manner. For example, as applied to a supercharged engine, I have illustrated a timing actuating cylinder 42 connected to the air inlet manifold by a duct 43 containing a piston 44 biased toward upward position by a spring 45 the lower side of the piston being vented to the atmosphere and having a piston rod 46 carrying a rack 47 in mesh with a geared quadrant 48 on eccentric shaft 49 which shaft carries the eccentric 50. The eccentric 50 actuates the yoke 51 having a laterally extended arm 52 pivoted at 53 to the air inlet push rod 13 so that rotation of the eccentric will move the air inlet cam roller 15 laterally to change the time of closing of the valve. Other mechanisms are well known and can be substituted for this device since the details of the control for varying the time of inlet valve closing form no part of my present invention. In a non-supercharged engine, naturally, I do not rely on variations in manifold pressure for varying the timing of the valve.

54 is a governor driven from the engine in the usual manner. It controls a throttle valve 55 in the gas manifold 26 whereby the supply of gas to the gas manifold is controlled in consonance with engine load conditions by the governor. 57 indicates adjustable control valves, there being one between the gas manifold and each of the cylinders, the governor controlling the overall supply of gas to the engine according to the engine load, the manual control valves being used to adjust the gas supply to the individual cylinders so that each cylinder will get its proper share of the gas fuel. Such valves may be useful but are not essential. They would not be used with liquid fuel injection.

58 is a pressure reducing valve in the gas supply line adapted to reduce the relatively high gas supply pressure down to the relatively low pressure at which gas is admitted to the engine cylinders.

Referring now to the crankshaft valve timing diagram, Figure 3, it will be remembered that the illustratively shown engine is a four stroke cycle engine. The piston moves to outer dead center on the power stroke, discharges spent products of combustion from the cylinder as it moves toward inner dead center in the exhaust stroke, draws in a charge as it moves back toward outer dead center on the inlet stroke, and then compresses the charge as it moves toward inner dead center on the compression stroke, when ignition occurs to start the next power stroke and so on.

In Figure 3, inner dead center and outer dead center are indicated respectively by the letters IDC and ODC. Toward the end of the compression storke, just before the piston reaches inner dead center, the spark plug ignites the charge at A. The charge expands and drives the piston outwardly toward the end of the power stroke at B, the exhaust valve opens and as the piston completes the power stroke and starts on the exhaust stroke, products of combustion are exhausted from the cylinder.

Just before the piston reaches inner dead center, on the exhaust stroke, the inlet valve opens at C, and scavenging air enters, passes through and is discharged from the cylinder, through the exhaust valve, while the latter is open during the scavenging period. The scavenging period terminates when the exhaust valve closes at D after the commencement of the suction stroke. Thereafter, the inlet valve remaining open, air continues to enter the cylinders.

Later, the gas inlet valve opens at E and remains open after the air inlet valve closes at F before outer dead center. In Figure 3, two positions of F are shown, $F_1$ for no load, $F_2$ for full load. As load varies, I vary the closing of the air inlet valve. Time of closing of this valve may, if desired, be controlled by the mechanism shown in Figure 1.

After the inlet valve has closed at F, internal expansion and cooling takes place from F to outer dead center at G and the gas valve finally closes at H as the piston commences its inward movement on the compression stroke. Gas will continue to enter the cylinder after the inlet valve closes so long as the pressure of the gas is above the pressure in the cylinder.

After the gas valve has closed at H, compression continues as the piston approaches inner dead center until the spark again fires the charge at A and the cycle is repeated.

The gas valve is never open when the exhaust valve is open, so all the gas that enters the engine cylinder remains in the cylinder to be compressed with the air in the cylinder during the compression stroke.

When the air inlet valve closes, the gas valve remains open, the piston still on its downward movement, the gas continues to enter the engine cylinder to mix with the air and gas already therein. At the time the inlet valve closes, the temperature and pressure of the gas and air in the cylinder will be substantially the temperature of the gas and air in the respective inlet manifolds. When the air inlet valve closes, the piston moving outwardly, the air and gas contained within the cylinder will expand and as a result, the temperature of the air and gas mixture at outer dead center will be substantially below the temperature at the time of closing of air inlet valve. Compression starts as the piston moves up from outer dead center and since final compression temperature depends on the temperature at the beginning of compression and the relation between maximum cylinder volume and clearance space, the fact that the temperature of the cylinder contents at the beginning of compression has been reduced far below the admission temperature of the air results in a much lower compression temperature than would be the case if compression started at admission temperature. As a result of this, the compression temperature is substantially lower than usual compression temperatures. Therefore, a rich gas mixture will not pre-ignite or detonate. Since combustion temperature is a function of compression temperature, and since compression temperature is a function of temperature at the beginning of the compression stroke, the engine operates without detonation, at a given octane rating, and at lower temperatures.

I have found that when conditions in the engine are properly controlled in accordance with my invention and the temperature of the compressed mixture is reduced by internal expansion, as described, then the engine can be operated with a mixture having very little or no excess air. Natural gas, for example, requiring 10 c. f. of air per 1 c. f. of gas, may be used at this ratio known as the chemically correct mixture.

I have further found that the highest thermal efficiency is obtained with about twenty percent excess air and that when the excess air is increased above this amount, the thermal efficiency of the engine falls rapidly due to the incomplete combustion in very lean mixtures, such as is obtained with fifteen to twenty cubic feet of air per cubic foot of gas (with natural gas).

My invention while especially well adapted to a supercharged engine is applicable to engines where only scavenging air rather than supercharging air enters the cylinder and while it is preferable in many instances to have the blower an exhaust turbine operated blower, other means can be used to provide the scavenging or supercharging air.

A spark ignited gas engine operates most economically with a small amount of excess air and this ratio of air to fuel should be substantially constant at all loads. This applies whether or not the engine is supercharged. As the load and indicated pressure is increased, the pressure in the cylinder, measured at the beginning of the compression stroke, must be increased directly as the MIP, provided that the manifold temperature does not change. This will maintain constant excess air at all loads.

Thus a non-supercharged engine in which the manifold pressure is constant when operating in accordance with my invention would close the inlet valve at no load so early in the intake stroke of the piston that the air could be expanded from atmospheric pressure to 3 p. s. i. a., which is an internal expansion ratio of about 5.

As the load increases on this non-supercharged engine, the inlet valve will close later in the intake stroke.

Full load on such a non-supercharged engine might, for example, be at 100 M. E. P.

When such an engine is supercharged with a turbocharger, the manifold pressure at no load will be about the same as in the non-supercharged engine, namely — atmospheric. The inlet valve will therefore close at about the same point in the intake stroke. However, now the manifold pressure increases with load and at 100 M. E. P. it may be 6 p. s. i. g. (20.7 p. s. i. a.) but to maintain the proper air-fuel ratio, the pressure in the cylinder at beginning of compression might be held down to about 14 p. s. i. a. The closing of the inlet valve, expands the pressure, say from 20.7 to 14 p. s. i. a.

Internal expansion functions as an air quantity regulating device but its equally important function is to reduce the temperature of the mixture before it is compressed, so that the final compression temperature at this high compression ratio is reduced to the compression temperature of a much lower compression ratio.

In my invention, the air to the manifold is not throttled but will be about atmospheric at no load, even when a turbo-charger is used. At the proper point in the stroke, the intake valve closes to entrap and provide the correct amount of air for the load. This results in a much smaller negative MEP and therefore, lower fuel consumption at all loads where less than a full cylinder charge is required.

In the foregoing, I have shown and discussed my system as applied to a four-cycle engine wherein the charge volume entrapped in the cylinder is regulated in consonance with the load by varying the volume taken in in the intake stroke in accordance with Figure 3. I can also, as shown in Figure 4, vary the volume of entrapped charge by first taking into the cylinder a volume equal to the total volumetric capacity of the cylinder, and then discharging the part of this charge which is in excess of that required for combustion of the fuel with the desired air-fuel ratio.

It will be noted that in my system as applied in Figure 4, the fuel is admitted after the inlet closes and the rejection of the excess charge of air has been completed.

With reference to Figure 5, I illustrate my system as applied to a two-cycle engine. It will be observed that scavenging is carried out in the usual manner but that the charge is partially rejected after the conclusion of scavenging, and thereafter an exhaust valve in the cylinder head closes and the gas valve opens and the volume entrapped for compression thereafter is substantially less than the maximum volumetric capacity.

In the two-cycle application of my system, as in the two four-cycle applications, as load decreases, the volume entrapped for compression also decreases. Since the various valve movements are fully indicated in the diagrams, it is thought that no further detailed description is necessary. The full load and no load positions, it will be observed, are shown in Figure 5, as they are also in Figures 3 and 4.

For convenience, in the claims I may refer to a gas-fueled engine and it will be understood by gas-fueled engine I mean an engine wherein a mixture of air and fuel is ignited in the cylinder after such mixture has been formed within the cylinder. Such air-gas mixture may be formed by supplying manufactured or natural gas to the engine and mixing it with the air in the cylinder or it may be formed by vaporizing or atomizing a liquid fuel, mixing it with a relatively small amount of air in connection with the formation of such gaseous fuel, which gaseous fuel is thereafter supplied to the cylinder for mixture with air in the cylinder to form a combustible mixture, or the combustible gaseous mixture may be formed outside of the cylinder and supplied to the cylinder for ignition thereafter.

In any event, the mixture of air and fuel in the cylinder is in generally gaseous form and the mixture is generally so distributed throughout the cylinder that when ignition takes place, substantially all of the mixture is of the same general character and substantially all of the mixture is such that combustion without substantial change in the character of the mixture may take place.

The use and operation of my invention, and its advantage over the conventional practice, are as follows:

In the conventional spark-ignited Otto cycle internal combustion engine, the compression ratio is equal to the expansion ratio because the total volume displaced by the piston is compressed into the combustion chamber. That is: compression begins when the piston is on outer dead center and expansion is continued until the piston reaches outer center on the power stroke. If, therefore, a low compression ratio is required to be able to operate without detonating, when using commercial fuel of say 70 to 80 octane, the thermal efficiency is necessarily low because thermal efficiency is a function of the expansion ratio and as shown, the expansion and compression ratios are equal in the conventional engine.

In accordance with my invention, I can now build an engine which has, for example, a combustion chamber volume which is $\frac{1}{10}$ of the volume swept by the piston and so has an expansion ratio of 11, and which has a net compression ratio of, for example, 6. This is accomplished by compressing into the clearance space a volume less than the volume swept by the piston, in this example, ½ of the swept volume. The method of regulating the volume to be compressed by closing the inlet valve early or rejecting a part of the charge, has already been described above.

A compression ratio of 6 produces a compression pressure 12.3 times the pressure in the manifold. Therefore, in a cylinder having a combustion chamber volume 1/10 of the piston displacement, I close the inlet valve early to limit the volume taken in or I hold valves open to reject a part of the charge so that the resulting compression pressure is 12.3 times the manifold pressure. The compression temperature will then be 2.04 times the manifold temperature or the same as in a conventional engine operating with 6 to 1 compression ratio.

Thus my engine can operate on fuels of the same octane rating as the conventional 6 to 1 compression ratio engine but since the expansion ratio is 11, my engine uses only 5300 instead of 6800 B. t. u.-I. H. P.-hr. and it, therefore, develops more power in the ratio of $$\frac{6800}{5300} = 1.28 \text{ per pound}$$

of air-gas mixture which is retained in the cylinder for compression.

It will be seen that when my engine, having an expansion ratio of 11, operates with a net compression ratio of 6, the expansion ratio of the manifold pressure to the pressure in the cylinder at the end of the intake stroke is 2.34.

This expansion causes a temperature drop of about 120 degrees F. Therefore, if the manifold pressure is such that after the expansion the pressure at the end of the intake stroke is equal to the pressure at this point in the conventional 6 to 1 compression ratio engine, the weight of the air retained for compression in my engine is about 17% greater than in the conventional engine. At equal pressures at the beginning of the compression stroke, the total increase in power of my engine over the conventional 6 to 1 compression ratio is, therefore, 1.28×1.17=1.50 or 50%.

In contrast to the conventional engine, which operates with quality governing in that the cylinder always takes in the same volume but at different pressures, my engine governs by quantity governing in that the piston motion takes in different volumes for different loads at constant pressure. If the supercharging air is supplied by a turbocharger whose speed responds to load, the manifold pressure will decrease with load. But, this pressure will be decreasing with decrease in load, if a turbocharger is used. Constant air-fuel ratio is then maintained at various loads by a combination of quality and quantity governing. But, as in the case of the constant manifold pressure, the volume retained in the cylinder for compression decreases with decrease in load. But at any load below full load, the volume retained in the cylinder is larger with a decreasing manifold pressure than with a constant manifold pressure.

In a naturally-aspirated engine the manifold pressure is constant at 14.7 p. s. i. a. With the assumed expansion ratio of 11 and net compression ratio of 6, the maximum pressure in the cylinder at the beginning of compression is 6.3 p. s. i. a. with a manifold pressure of 14.7 p. s. i. a. The maximum M. I. P. is 106 p. s. i. a.

With a manifold pressure of 36.4 p. s. i. a. and the volume of air retained in the cylinder selected to produce a net compression ratio of 6, the maximum M. I. P. is 248 p. s. i. g.

Quality governing by throttling at the intake manifold is notoriously inefficient because a negative M. I. P. is developed on the intake stroke when the pressure in the manifold is less than atmospheric. This negative M. I. P. increases with decrease in load, reaching maximum at no load. It is calculated by deducting the M. I. P. on the intake stroke from the M. I. P. on the underside of the piston which is atmospheric pressure or 14.7 p. s. i. a.

If, for example, the friction of an engine is such that it requires 45 p. s. i. mean effective pressure to drive it at no load, the conventional engine would operate with a manifold pressure of 4 p. s. i. a. if there were no negative work, but the negative M. E. P. with a manifold pressure of 4 p. s. i. a. is about 10 p. s. i. Therefore, to develop a net M. E. P. of 45, the power stroke must develop 55 instead of 45 M. E. P., and since the fuel consumption per I. H. P./hr. is constant, the total fuel used will increase in the ratio of 55 to 45 or about 22%. (The negative M. E. P. is 14.7−5=9.7 p. s. i. at a manifold pressure of 5 p. s. i.) When the suction stroke begins, the volume in the clearance space expands to the manifold pressure, which is 5 p. s. i. a.

Thus, it is seen that in my engine, the negative work on the suction stroke is 4.6 p. s. i. less than in the conventional engine using inlet manifold throttling. The pressure is 4 p. s. i. a. and to compress this to a pressure of 115 p. s. i. a. at the end of compression stroke equals a mean effective pressure of 17.7 p. s. i.

With manifold throttling, a pressure of 5 p. s. i. a. is required at beginning of compression and the work to compress this to 144 p. s. i. at end of compression equals a mean effective pressure of 22.3 p. s. i. The difference in total negative work in favor of my system is then (9.2−4.6) plus (22.2−17.7)=9.1 p. s. i.

This example serves to show that the method of selecting the volume retained in the cylinder in consonance with load is fundamentally more efficient than the conventional method of throttling the pressure in the manifold.

As explained before, inlet manifold throttling produces excessive negative work on the suction stroke and requires more work to compress the charge at any given load below full load than is the case in my system.

While I have shown and described the preferred form and one variation of my invention, it should be understood that numerous alternatives can be used or substitutions made which will be readily apparent. For example, it is clear from the disclosure that the invention can be applied to or practiced on either a two or four stroke cycle engine. The particular type of gaseous fuel used is also unimportant. I therefore wish that my invention be unrestricted except as by the appended claims.

I claim:

1. In a gas-fueled, spark-fired internal combustion engine adapted to operate under varying loads, a valve-and-port mechanism for the cylinders of the engine for the admission of fresh air and the expulsion of burnt gases, means for supplying fresh air to the cylinders through at least a part of the valve-and-port mechanism, a gas valve for the cylinders for separately supplying gaseous fuel to mix with the air, means for varying the quantity of fuel supplied in relation to the load on the engine, and a valve actuating mechanism for opening and closing at least a part of the valve-and-port mechanism, including means to entrap a volume of air at full load which is substantially less than the full volumetric capacity of the cylinders, and means for maintaining an approximately constant air-fuel ratio mixture in the cylinders during all loads, said means including a device for timing only the closing of the valve-and-port mechanism so that as the load varies, the quantity of air entrapped, when mixed with the fuel supplied, will result in an approximately constant air-fuel ratio mixture.

2. The structure of claim 1 in which the air supplying means includes a supercharger for initially compressing the inlet air to an elevated temperature and pressure, and an intercooler for cooling the air before it enters the cylinders.

3. The structure of claim 1 in which the device for timing the closing of the valve-and-port mechanism is constructed and adapted to vary the timing of the valve-and-port mechanism in direct relation to the load so that as the load rises, the timing of closing will be varied.

4. The structure of claim 1 in which the device for timing the closing of the valve-and-port mechanism is constructed and arranged to close the valve-and-port mechanism before bottom dead center on the suction stroke.

5. The structure of claim 1 in which the device for timing the closing of the valve-and-port mechanism is constructed and adapted to close after bottom dead center to entrap air for compression.

6. The structure of claim 1 in which the engine is naturally aspirated, and wherein the valve actuating mechanism includes means for varying the time of closing the valve-and-port mechanism in relation to the load.

7. In a gas-fueled, spark-fired, internal combustion engine adapted to operate under varying loads, a valve-and-port mechanism for the cylinders of the engine, means for supplying air to the cylinders at a pressure, at all loads, at least as great as atmosphere, means for supplying gaseous fuel for the cylinders, means for varying the quantity of fuel supplied in relation to the load, an actuating mechanism for opening and closing at least a part of the valve-and-port mechanism, including a device for actuating said part of the valve-and-port mechanism so that, at each load, an approximately constant air-fuel ratio mixture will result in the cylinders, and means for closing the valve-and-port mechanism at full load to entrap a volume that is substantially less than the full volumetric capacity of the cylinders.

8. The structure of claim 1 in which the engine is adapted to operate under varying loads over a selected load range, a compressor for preliminarily compressing the inlet air to an elevated temperature, weight, and pressure on the order of two atmospheres at full load, means for cooling the air to an approximately constant temperature on the order of 100° F. as the load varies in the selected load range after the air is preliminarily compressed and before it is supplied through the valve-and-port mechanism to the cylinder, the valve-and-port mechanism for the cylinders including valve means, said device for timing only the closing of the valve-and-port mechanism including means for timing the closing of the valve means at full load to provide an effect compression ratio on the order of 6 to 1 that gives a temperature rise, in the entrapped air due alone to compression, which, when added to the approximately constant temperature of the air after the cooling means, plus the temperature rise of the air due to heating from the engine parts, produces a final compression temperature in the cylinder which is no greater than the ignition temperature of the fuel, and means for timing the opening of the valve means so that, at full load, the expansion ratio will be on the order of 12 to 1.

9. The structure of claim 8 further characterized in that the timing means for closing the valve means is constructed and arranged to vary the time of closing of the valve means so that the volume of air entrapped for compression by the piston varies in direct relation to the load so that as the load rises, the entrapped volume increases and vice versa.

10. The structure of claim 8 in which the engine is a four-cycle engine, the valve means including inlet and exhaust valves, the inlet valve being closed by the timing means to provide the effective compression ratio on the order of 6 to 1 at full load, the means for timing only the closing of the valve means at full load being constructed to vary the time of closing of the inlet valve.

References Cited in the file of this patent

UNITED STATES PATENTS

| | | |
|---|---|---|
| 1,082,004 | Anthony | Dec. 23, 1913 |
| 1,316,977 | Ricardo | Sept. 23, 1919 |
| 1,330,496 | Ruegg | Feb. 10, 1920 |
| 1,497,206 | Booton | June 10, 1924 |
| 2,035,569 | Ricardo | Mar. 31, 1936 |
| 2,292,233 | Lysholm | Aug. 4, 1942 |

FOREIGN PATENTS

| | | |
|---|---|---|
| 542,429 | Great Britain | Jan. 8, 1942 |

UNITED STATES PATENT OFFICE
CERTIFICATE OF CORRECTION

Patent No. 2,773,490                                  December 11, 1956

Ralph Miller

It is hereby certified that error appears in the above numbered patent requiring correction and that the said Letters Patent should read as corrected below.

In the drawings, Sheet 3, the figure at the top of the page designated as "Fig. 4" should be designated as -- Fig. 5 --; the figure at the bottom of Sheet 3 designated as "Fig. 5" should be designated as -- Fig. 4 --.

Signed and sealed this 15th day of March 1966.

(SEAL)
Attest:

ERNEST W. SWIDER                                  EDWARD J. BRENNER
Attesting Officer                                      Commissioner of Patents